United States Patent Office 3,573,276
Patented Mar. 30, 1971

3,573,276
ALKYLSULPHONYL-COBALAMINES
Otto Wagner, Wuppertal-Elberfeld, Germany, assignor to Farbenfabriken Bayer Aktiengesellschaft, Leverkusen, Germany
No Drawing. Filed Oct. 10, 1968, Ser. No. 766,633
Claims priority, application Germany, Oct. 14, 1967, F 53,777
Int. Cl. C07d 55/62
U.S. Cl. 260—211.7      9 Claims

ABSTRACT OF THE DISCLOSURE

Alkylsulphonyl-cobalamines are produced by reacting hydroxo-cobalamine with alkyl-sulphinic acids at ambient temperature or at slightly elevated temperatures. They may also be prepared by reacting cyano-cobalamines with alkyl-sulphinic acids. The alkylsulphonyl-cobalamines are useful in the same manner as vitamin $B_{12}$ and may be administered in the same general dosage ranges and by the same general routes of administration.

---

The present invention is concerned with alkylsulphonyl-cobalamines. The detection of a carbon-cobalt bond in the vitamin $B_{12}$-coenzyme where the carbon atom of the bond is a normal $sp^3$-hybride [1], imparted new aspects to the chemistry and biochemistry of vitamin $B_{12}$. (Bracketed numbers refer to the literature references set forth in (column 3).

In parallel thereto it could be shown that the reaction of sulphurous acid or its salts on cobalamines leads to the formation of cobalamines-sulphonic acid with a direct cobalt-sulphur bond [2, 3].

In cobalamines, the physicochemical peculiarities of the cobalt-carbon and cobalt-sulphur bond are similar. This statement refers to the sensitivity to light, the cathodic halfwave potential at the dropping mercury electrode and, finally, to the UV-spectrum [see 3, 4, 5].

It was also possible to show that the cobalamine-sulphonic acid is closely related to the natural vitamin $B_{12}$-coenzyme; this is probable on the ground of the very rapid and complete enzymatic conversion into the biologically active form in vitro [3].

The attempt to react cobalamine with a substituted sulphurous acid, for example the aryl- or alkyl-sulphinic acids, have hitherto failed [see 3]. It was only possible to react toluene- or benzene-sulphinic acids with cobinamide to form the addition products p-toluene-sulphonyl-cobinamide or benzene - sulphonyl - cobinamide [3, 6]. However, cobinamide is a nucleotide-free derivative of vitamin $B_{12}$ which is virtually biologically inactive. It was therefore of interest to attempt to produce this class of compounds also from the complete vitamin $B_{12}$.

The object of the invention comprises stable addition products of alkyl-sulphinic acids and hydroxo-cobalamine, i.e. alkylsulphonyl-cobalamines with direct sulphur-Co bonds. Of particular interest are those alkyl-sulphonyl-cobalamines wherein the alkyl group is lower alkyl. According to the preferred embodiment the lower alkyl group contains 1 to 6 carbon atoms.

The properties of a typical representative of the new compounds, n - butylsulphonyl - cobalamine (BSC), are the following:

Chromatographically, BSC passes uniformly and markedly more rapid than cyano-cobalamine or cobalamino-sulphonic acid.

This behaviour is to be expected in the presence of a lipophilic butyl group:

TABLE 1

| Developer | R<br>$B_{12}$ | R<br>CS[1] | R<br>$f$ |
|---|---|---|---|
| A | 1.40 | 3.00 | 0.31 |
| B | 1.32 | 2.83 | 0.35 |

[1] Cobalamine-sulphonic acid.

Electrophoretically, BSC is neutral in the pH-range between 2.5 and 11.

This behaviour can be explained by the following formula

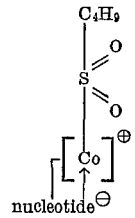

In the course of the electrophoresis, a slight conversion into hydroxo-cobalamine (appr. 1%) passing in a weak zone towards the cathode, occurs at pH 2.5.

On the other hand, a strong conversion into hydroxo-cobalamines occurs at pH 11 already after a short running time of the electrophoresis. The substance remaining in the neutral zone was found to be residual BSC.

In the ion exchangers, BSC behaved according to expectation over CM-cellulose as well as over DEAE-cellulose. That is to say that it passes without delay through the CM-column and the DEAE-column, hydroxo-cobalamine being formed in the basic DEAE-cellulose in varying amounts, as was to be expected. No conversion takes place in the CM-cellulose.

The UV-spectrum is similar to that of cobalamine-sulphonic acid [3]. After the addition of KCN, the normal spectrum of dicyano-cobalamine appears.

The IR-spectrum of BSC differs only slightly from that of the starting material. This is to be expected on account of the molecular size and the symmetry of the compound.

Crystallisation of BSC usually proceeds without disturbance and yields well-defined crystal shapes.

Elementary analysis of the crystals after repeated recrystallisation yields the following result:
$C_{64}H_{98}O_{16}N_{13}N_{13}PSCo$ (mol. weight: 1451.50)—Calculated (percent): C, 52.90; H, 6.80; N, 12.54; S, 2.20. Found (percent): C, 52.35; H, 7.22; N, 12.12; S, 2.49.

It is known that alkyl-sulphonic acids can be titrated with sodium nitrite in an acidic solution. Potassium iodide-starch paper serves for determination of the final point of the titration.

The n-butyl-sulphinic acid was found to have a strength of approximately 50%, i.e. $10^{-4}$ gram-mole required 1.2 ml. of n/50 sodium nitrite solution. This result was confirmed when the determination was repeated several times.

When additional $10^{-4}$ gram-mole BSC are added to $10^{-4}$ gram-mole n-butyl-sulphinic acid, the sodium nitrite consumption should be approximately doubled, if the additional ligand which has entered the BSC and which makes the difference between hydroxo-cobalamine and BSC, were still oxidisable. However, repeated titration shows that the nitrite consumption of 1.3 ml. is constant and thus exclusively determined by the concentration of the free n-butyl-sulphinic acid.

The stability of BSC in an aqueous solution is restricted to the pH range from about 4 to 9. In an acidic and, particularly, in an alkaline solution, there occurs conversion into equo- or hydroxo-cobalamine.

The reaction of cyanide ions on the aqueous solution of BSC leads to the immediate and quantitative conversion into cyano- or dicyano-cobalamine. This finding was confirmed by chromatography in two developer systems, by electrophoresis at pH 2.8 and by the taking and quantitative evaluation of the UV-spectrum.

In respect of the sensitivity to light, BSC forms an exception, in spite of its UV-spectrum being similar to that of cobalamine-sulphonic acid. No conversion into hydroxo-cobalamine could be detected after intensive illumination with sunlight for several hours.

The biological activity against the test organism "*Lactobacillus leichmanii*" corresponds to the full activity of vitamin $B_{12}$.

The new compounds are prepared by reacting hydroxo-cobalamine in solution with alkyl-sulphinic acids at room temperature or at slightly elevated temperature.

The hydroxo-cobalamine used as starting material is prepared by illumination of cobalamine-sulphonic acid, crystallized, and compared with known hydroxo-cobalamine by chromatography in three developer systems and by electrophoresis at pH 2.8.

The reacted hydroxo-cobalamine was free from cyano-cobalamine and cobalamine-sulphonic acid. Its IR-spectrum was in accordance with that of the authentic hydroxo-cobalamine.

The new compounds are to be used as therapeutic agents in cases where a vitamin $B_{12}$ therapy is indicated.

LITERATURE

[1] Lenhert and Hodgkin: Nature (Lond.) 192, 937 (1961)
[2] Bernhauer, Muller, and Wagner: (II) Europ. Symp. uber Vitamin $B_{12}$ u. Intrinsic Factor, Hamburg, 1961, S. 110. Stuggart: End of 1962
[3] Bernhauer and Wagner: Biochem. Z. 337, 366 (1963)
[4] Bernhauer, Muller and F. Wagner: Angew, Chemie 23, 1145 (1963)
[5] Bernhauer, Muller and F. Wagner: Advanc. Enzymol., vol. 24, S. 233, Intersc. Publ. (1964)
[6] Wagner: Dissertation, T. H., Stuttgart, 1963

EXAMPLE 1

1 g. hydroxo-cobalamine is dissolved in 400 ml. of water and mixed with about 300 ml. of a 25% ethanol/water solution containing, per 100 ml., about 250 mg. n-butyl-sulphinic acid. The mixture is heated at 50° C. for one hour and the ethanol is then removed by vacuum distillation. The aqueous solution is taken up in 200 ml. of a mixture of 1 part by weight phenol and 2 parts by weight chloroform. The phenolic phase is then washed twice with 100 ml. portions of water, the wash water is discarded. 100 ml. n-butanol, 100 ml. diisopropyl ether and about 200 ml. of water are then added to the phenolic phase. The mixture is vigorously shaken in a separating funnel for several minutes. The aqueous phase contains the n-butyl-sulphonyl-cobalamine. The shaking with water has to be repeated until the organic phase has become virtually colourless. The aqueous solution thus obtained is again shaken with about 80 ml. diisopropyl alcohol, concentrated to a volume of about 30 to 50 ml., mixed with 100 ml. acetone and caused to crystallize at +4° C. Yield: about 92%.

EXAMPLE 2

1 g. cyano-cobalamine is dissolved in 500 ml. of water and mixed with 500 ml. of a 25% ethanol/water solution containing, per 100 ml., about 250 mg. n-butyl-sulphinic acid.

The process seps of Example 1 are then followed to produce n-butyl-sulphonyl-cobalamine.

EXAMPLE 3

1 g. hydroxo-cobalamine is dissolved in 400 ml. of water and mixed with 400 ml. of a 25% ethanol/water solution containing, per 100 ml., about 300 mg. ethyl-sulphinic acid.

The process steps of Example 1 are then followed to produce ethyl-sulphonyl-cobalamine.

EXAMPLE 4

1 g. hydroxo-cobalamine is dissolved in 400 ml. of water and mixed with 400 ml. of a 50% ethanol/water solution containing, per 100 ml., about 350 mg. n-hexyl-sulphinic acid.

The process steps of Example 1 are then followed to produce n-hexyl-sulphonyl-cobalamine.

EXAMPLE 5

1 g. cyano-cobalamine is dissolved in 500 ml. of water and mixed with 500 ml. of a 50% ethanol/water solution containing, per 100 ml., 350 mg. n-hexyl-sulphinic acid.

The process steps of Example 1 are then followed to produce n-hexyl-sulphonyl-cobalamine.

The compounds of the present invention are administered for treatment of conditions for which $B_{12}$ is administered in the same general dosage range as $B_{12}$ and administration is effected by the same routes as $B_{12}$.

What is claimed is:
1. An alkylsulphonyl-cobalamine wherein the alkyl moiety is lower alkyl.
2. An alkylsulphonyl-cobalamine according to claim 1 wherein the lower alkyl moiety is of 1 to 6 carbon atoms.
3. n-Butyl-alkylsulphonyl-cobalamine.
4. Ethyl-alkylsulphonyl-cobalamine.
5. n-Hexyl-alkylsulphonyl-cobalamine.
6. A process for the production of lower alkylsulphonyl-cobalamines which comprises reacting hydroxo-cobalamine and alkyl-sulphinic acid and recovering the lower alkylsulphonyl-cobalamine produced.
7. A process according to claim 6 wherein the alkyl moiety of the alkyl sulphinic acid reactant is lower alkyl of 1 to 6 carbon atoms.
8. A process for the production of lower alkylsulphonyl-cobalamines which comprises reacting cyano-cobalamine and lower alkyl-sulphinic acid and recovering the lower alkylsulphonyl-cobalamine produced.
9. A process according to claim 8 wherein the alkyl moiety of the alkyl sulphinic acid reactant is lower alkyl of 1 to 6 carbon atoms.

References Cited

UNITED STATES PATENTS

| | | | |
|---|---|---|---|
| 2,796,383 | 6/1957 | Robinson | 260—211.7 |
| 3,033,849 | 5/1962 | Sifferd | 260—211.7 |

LEWIS GOTTS, Primary Examiner

J. R. BROWN, Assistant Examiner

U.S. Cl. X.R.

424—201

PC-1050
(5/69)

UNITED STATES PATENT OFFICE
CERTIFICATE OF CORRECTION

Patent No. 3,573,276          Dated March 30, 1971

Inventor(s)  Otto Wagner

It is certified that error appears in the above-identified patent and that said Letters Patent are hereby corrected as shown below:

Claim 3. n-Butyl-sulphonyl-cobalamine.

Claim 4. Ethyl-sulphonyl-cobalamine.

Claim 5. n-Hexyl-sulphonyl-cobalamine.

In column 2, line 49, "$C_{64}H_{98}O_{16}N_{13}N_{13}PSCo$" should read -- $C_{64}H_{98}O_{16}N_{13}PSCo$ --.

Signed and sealed this 7th day of September 1971.

(SEAL)
Attest:

EDWARD M. FLETCHER, JR.          ROBERT GOTTSCHALK
Attesting Officer                Acting Commissioner of Pate